Feb. 17, 1942.   N. M. McCULLOUGH   2,273,365
VEHICLE CONTROL AND SPEED INDICATING SYSTEM
Filed Dec. 18, 1937   2 Sheets-Sheet 1
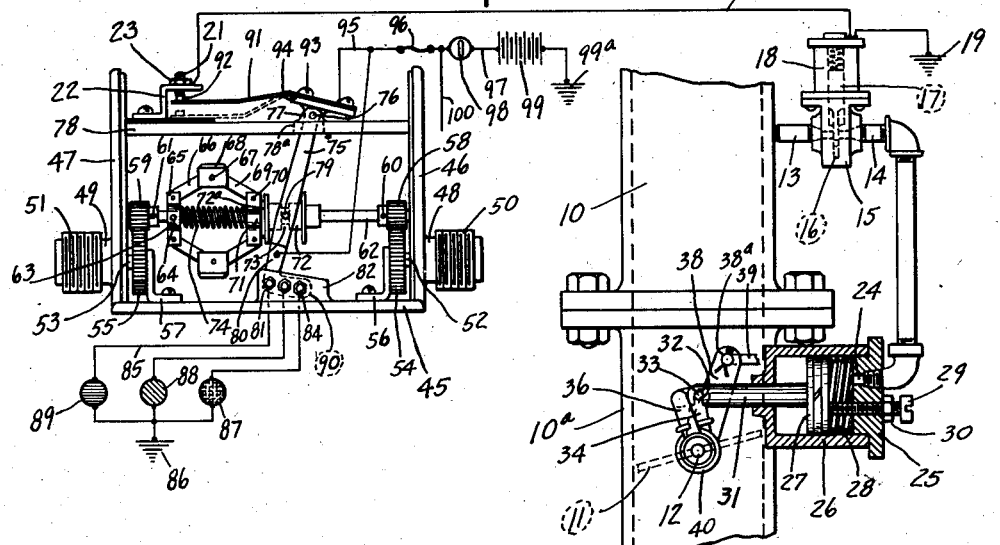
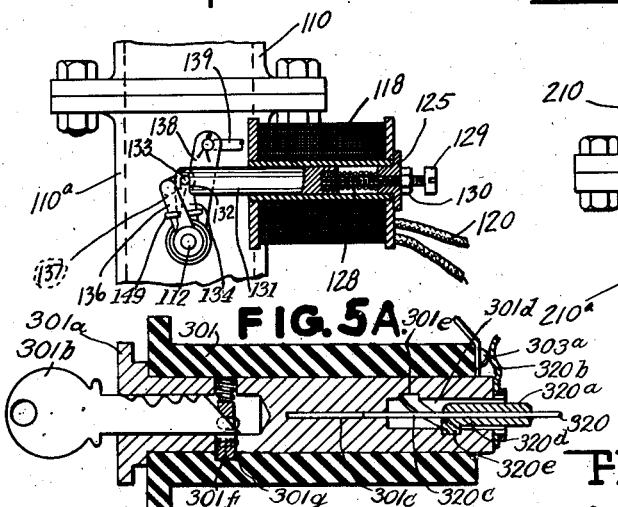
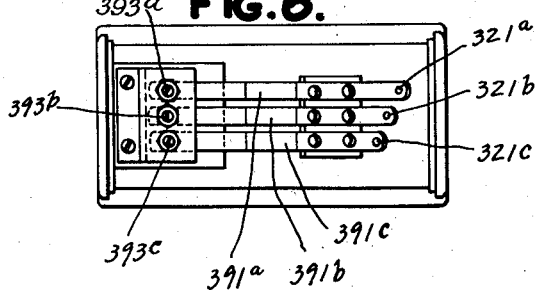
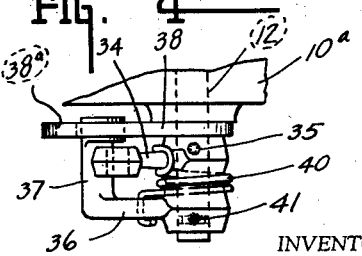
INVENTORS.
NEEL M. McCULLOUGH.
BY *Lockwood, Goldsmith & Geet*
ATTORNEYS.

Feb. 17, 1942.   N. M. McCULLOUGH   2,273,365
VEHICLE CONTROL AND SPEED INDICATING SYSTEM
Filed Dec. 18, 1937   2 Sheets-Sheet 2
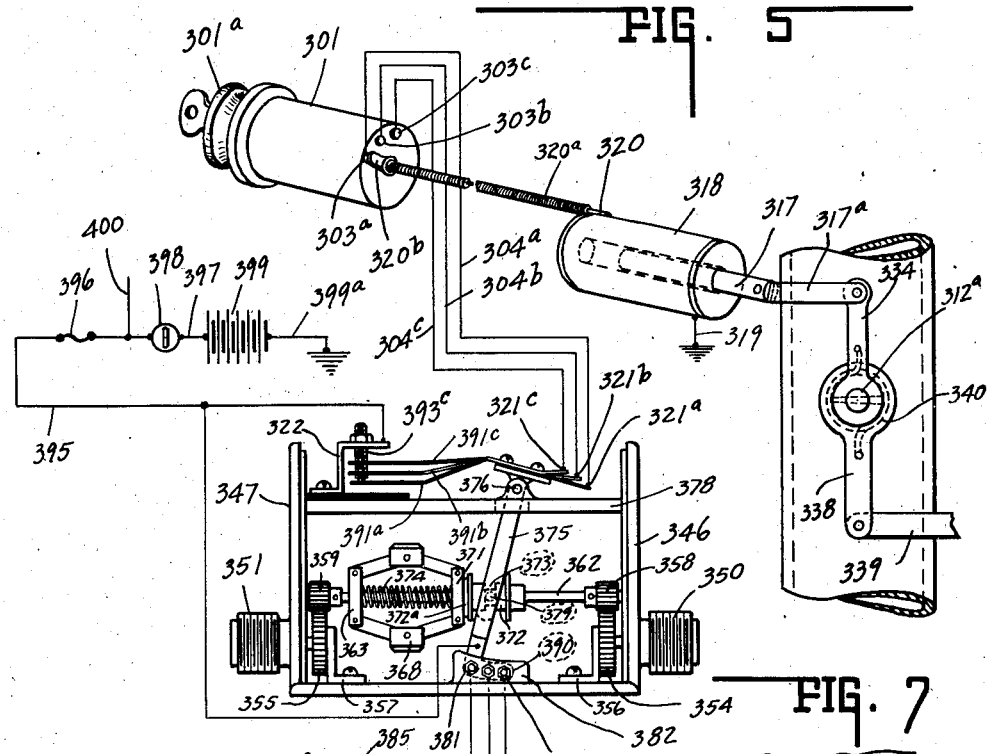
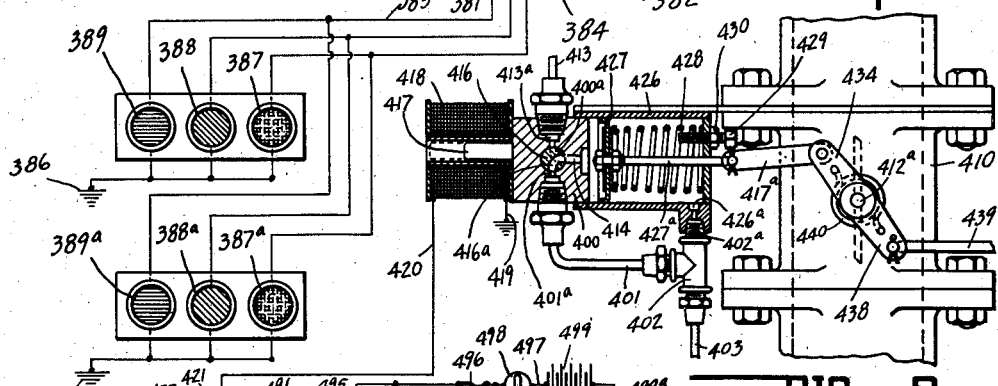
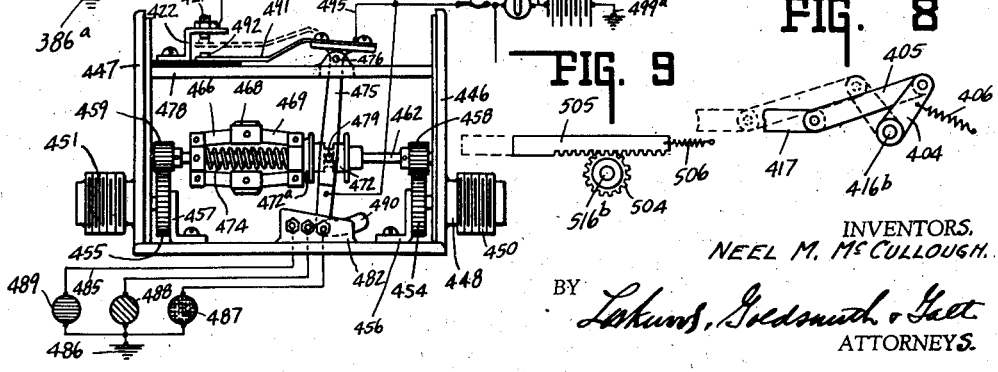
INVENTORS.
NEEL M. McCULLOUGH.
BY
ATTORNEYS.

Patented Feb. 17, 1942

2,273,365

UNITED STATES PATENT OFFICE 2,273,365

VEHICLE CONTROL AND SPEED INDICATING SYSTEM

Neel M. McCullough, Anderson, Ind., assignor to Pierce Governor Company, Anderson, Ind., a corporation Application December 18, 1937, Serial No. 180,497

2 Claims. (Cl. 180—82.1)

This invention relates to a control system for self-propelled vehicles having a speedometer drive and an engine provided with a fuel passage and a fuel controlling valve therein.

One chief object of the invention is to provide an automatic control which will not only indicate visually and internally and/or externally of the vehicle the speed thereof, but is at the same time automatically arranged to control the fuel supply upon the vehicle attaining a predetermined speed.

Another chief object of the invention is to provide a manual arrangement whereby the fuel control may be of multiple character that is responsive to different speeds and the manual selection of the predetermined speed can be imposed upon the control system for the automatic operation thereof, as previously described.

Another object of the invention is to associate with the manual control a lock arrangement whereby the owner of the vehicle may select the desired maximum vehicle speed for the vehicle and impose the selection upon the control system to prevent speeding of the vehicle beyond the selected vehicle speed.

The chief feature of the invention consists in the construction and arrangement of a control system whereby the several objects are accomplished.

Other features and objects of the invention will be more fully set forth hereinafter.

The full nature of the invention will be understood from the accompanying drawings and the following description and claims:

In the drawings,

Fig. 1 is an elevational view in semi-diagrammatic form of a speedometer operable control, the signal means associated therewith and one form of engine control means automatically operable by the system upon attainment of the predetermined speed.

Fig. 2 is a view similar to the right hand portion of Fig. 1 and illustrates a simpler and modified form of the invention.

Fig. 3 is a similar view of still a further modified form of the invention.

Fig. 4 is a top plan view of a portion of a lever system associated with the fuel controlling valve.

Fig. 5 is a view similar to Fig. 1 and of another embodiment of the invention of more complicated form and the preferred form of the invention.

Fig. 5—A is an enlarged sectional view of a lock controlled speed selecting switch.

Fig. 6 is a top plan view of the switch mechanism illustrated in Fig. 5.

Fig. 7 is a view similar to Fig. 1 and of a pressure type system, the pressure portion being shown in section.

Fig. 8 is a plan view of the solenoid control portion of the system shown in Fig. 7.

Fig. 9 is an elevational view similar to Fig. 8 of a modified form of control.

In Figs. 1 and 4 of the drawings 10 indicates the fuel intake portion of an internal combustion engine supply and the same includes a valve 11 carried by a shaft 12 which projects outwardly from the conduit or fuel supply passage portion 10a. Portion 10a may be of the adaptor insert type, as is well known in the internal combustion art, being interposed between the end of the engine intake manifold and the carburetor.

In the form of the invention shown in Fig. 1, a conduit 13 communicates with the conduit 14 through a valve body 15 controlled by a valve member 16, the stem 17 of which constitutes the core of a solenoid 18. One terminal of the solenoid is grounded as at 19. The other terminal is connected by the line 20 to a switch terminal or contact 21 adjustably supported by a threaded connection in the supporting bracket 22 and locked therein by the nut 23.

The conduit 14 communicates with a port 24 in a cylinder head 25 detachably supported by a cylinder 26 in which is mounted a piston 27 normally constrained toward the left by spring 28. A stop member 29 in the form of a bolt has threaded connection with the head 25 and extends therethrough and is adapted for engagement by the piston at such time as the valve 16 is opened through energization of solenoid 18 so that the vacuum in the intake passage is effective upon the piston 27, to move the same to the right and compress spring 28, such movement continuing until the piston engages the exposed inner end of the stop 29, the position of which is locked in adjusted position by the nut 30.

The piston 27 carries a piston rod 31 which at its free end includes a notch 32 that seats a pin 33 carried by lever arm 34 which is pinned to the shaft 12 as at 35. Another lever arm 36 has an angular portion 37 which lies behind—see Fig. 4—the lever 34 and projects into the plane of the lever 38, the latter being apertured as at 38a for connection to a manually operable member 39 connected to a hand and/or foot throttle arrangement.

A spring 40 is concentric with the shaft and has its opposite ends associated with the two adjacent lever arms 34 and 36 so that within the range of the spring the arms may be independently operated and at other times they are simultaneously operated. A set-screw 41, or the like, prevents axial displacement of the lever arm 36 relative to the shaft 12 but permits the lever arm to have rotation relative to the shaft.

The position of the parts described is illustrated in Fig. 1, as where the vacuum of the intake has operated the rod 31 to move the valve in the intake into substantially closed position.

In the left hand portion of Fig. 1, 45 indicates a base and 46 and 47 indicates two sides of a frame structure which include projecting bosses 48 and 49, respectively, threaded as at 50 and 51, respectively. These bosses are tubular and the speedometer drive protecting sheating has threaded connection with one of the threaded portions and the sheathing of that portion of the drive leading to the speedometer has threaded connection with the other threaded portion.

The shaft portion of the drive has the usual tongue and groove connection within this threaded portion and with the shaft that extends into the housing defined by the frame members last mentioned.

Herein two shafts 52 and 53 are illustrated which have secured thereto the gears 54 and 55, respectively, the latter being supported by the brackets 56 and 57, respectively, and said gears mesh with the pinions 58 and 59, respectively, secured as at 60 and 61, respectively, to the shaft 62.

A sleeve 63 is suitably secured to the shaft 62 as at 64 and includes a plurality of outwardly extending ears 65 which are pivotally connected to link means 66, in turn pivotally connected as at 67 to weights 68. Also pivotally connected at 67 to the weights 68 are oppositely arranged link means 69, in turn pivotally connected at 70 to a sliding collar 71 rigid with which is the grooved collar portion 72 having the groove 73 therein. A spring 74 is concentric with the shaft 62 between the two collars 71 and 63 and normally tends to maintain the respective pairs of links 66 and 69 in aligned position.

A pair of lever members 75 is pivotally supported at 76 in ears 77 carried by the upper base member 78 of the frame, said lever extending through the aperture 78a beneath the ears and between the same. Extending inwardly toward each other from each of the arms is a pin 79 that rides in the groove 73.

As the power portion of the speedometer drive is rotated in response to the vehicle speed, the shaft 62 is rotated in proportion thereto and the weights 67 and links 66 and 69 are subjected to centrifugal force. The tendency of these parts to move outwardly away from the shaft at the weight connections is resisted by the spring 74 at the predetermined speed for which the spring tension is adjusted, which adjustment may be provided between the portion 72a and the collar 71 or at any other portion of the device, since the aforesaid constitutes a centrifugal governor commonly known as the phonograph governor mechanism. When the speed is that for which the centrifugal force will in opposition to the spring load, howsoever adjusted, move the weights outwardly away from the shaft, the collar 72 will be moved to the left on the shaft 62 and thus automatically tilt the lever arrangement to the left in clockwise relation relative to the pivot 76.

One arm of the lever is extended as at 80 beyond the yoke connection to the sleeve 72 and terminates in a contact portion 81. A bracket 82 supports in insulated relation terminal studs 84 which are arranged arcuately, the radius of the arc corresponding to the radial length of the lever arm 75 including the contact portion 80.

Thus, as the lever is caused to move through the governor structure, the successive terminal contacts 84 are engaged to complete a circuit to respective electric conductors 85, each of which is connected to a light bulb of a signal arrangement, the bulbs in turn being grounded as at 86. Herein signal 87 is the low speed signal. It may be amber or yellow. Signal 88 is the medium speed signal and it may be green. Signal 89 is the high speed signal and it may be blue. The device may be arranged, for example, so that the light bulb in signal 87 will be energized when the vehicle speed of approximately 30 M. P. H. is attained. Upon the vehicle speed reaching, for example, 32 M. P. H. to 45 M. P. H., signal 88 will be energized and after the vehicle exceeds 45 M. P. H., the high speed visual signal will be energized.

Light contacts may be so positioned that the first light will be energized when the ignition is closed or a separate light in series with the main supply to the control may be provided and this would be a pilot light indicating operation condition of the control circuit.

Should regulations be such that the use of different colored signals is prohibited, there is provided an arcuate arm 90. In this event, the lower speed arrangement signal 87 will be energized. When the vehicle attains a speed known as an intermediate speed, then both signals 87 and 88 will be first energized and when the vehicle attains a high speed, all three signals will be energized. Any other range of speeds and numbers of signals may be provided as will be quite apparent from the foregoing disclosure.

These signals may be arranged in multiple as will be hereinafter more fully illustrated and described with reference to the form of the invention shown in Fig. 5. In the present form of the invention, these signals are positioned externally of the vehicle so as to be visible from both the front and rear thereof so that at all times these signals will indicate the range of speed at which the vehicle is travelling. The signals simultaneously viewable from front and rear of the vehicle may be mounted for example, on the left front fender and may be arranged for observation by the driver as well.

If, for example, it is desired that the vehicle be permitted to travel at a speed not exceeding 50 M. P. H., then the valve operating mechanism does not become operative until 50 M. P. H. vehicle speed is attained, whereupon it becomes automatically operable. Of course, when the vehicle has attained this speed in the first instance, only signal 89 will be energized and in the second instance, all three signals 87—88—89 will be energized.

The means for energization of the valve operating valve mechanism is shown in the upper portion of Fig. 1 and includes a flexible finger 91 which carries a contact 92. Finger 91 is suitably secured as at 93 to a lateral flange portion 94 suitably secured to the two lever arm members 75, so that the finger 91 is tiltable in a clockwise direction with and by the tilting of the arm structure 75. A conductor 95 is in electrical connection with the finger 91 and the contact portion 80 of the arm 75. It is connected through a fuse structure 96 to line 97 controlled by the ignition lock switch 98, the latter also controlling the ignition line 100, the energization being derived from a suitable source diagrammatically illustrated herein as by a battery 99, it being grounded as at 99a.

When the predetermined speed for which the governor structure is adjusted and the contact 21 is adjusted is attained, contact 92 engages contact 21 to complete the circuit through the solenoid 18 and through the ground 19 and 99a to the battery providing the ignition switch 98 is in condition for vehicle operation, which must be so conditioned in order to secure internal combustion engine operation to secure vehicle movement under normal conditions.

In Fig. 2 there is illustrated a modified form of the invention and in this figure numerals of the one hundred series indicate like or equivalent parts, the departures being as follows: The operating rod 131 in this instance instead of comprising a piston rod constitutes the core of the solenoid 118, the supply line 120 of which is adapted to supply current to the solenoid when the switch mechanism indicated in the upper portion of the left hand portion of Fig. 1 is in closed position. This figure illustrates the rod or plunger 131 in the fuel controlling position. By reference to Fig. 4 the several levers and the interconnections therebetween and the valve operating rod will be understood.

A stop member 129 has threaded engagement with the support 125 and is locked in the adjusted position by the nut 130. Concentric with the stop member 129 within the bore of the solenoid is the spring 128 which normally constrains the core or stem or rod 131 toward the left—see Fig. 2. The operation of the device illustrated in Fig. 2 is substantially the same as that illustrated in Fig. 1, with this exception, that instead of utilizing a variation of pressure for operation of the stem, the operation of the stem is directly controlled by the solenoid instead of indirectly controlled thereby, as shown in the right hand portion of Fig. 1.

A further modified form of the invention is illustrated in Fig. 3 and this is similar to the lower half of the right hand portion of the invention illustrated in Fig. 1 and briefly may be said to comprise a diaphragm type of power in place of the piston type of power shown in Fig. 1. Numerals of the two hundred series indicate like or equivalent parts. Thus the conduit 214, it will be understood, is controlled by a valve such as illustrated in Fig. 1 and indicated by the numeral 15. The diaphragm housing is indicated by the numeral 226 and threadedly supports the stop member 229 locked as at 230 and concentric with which is a coil spring 228 which normally constrains the diaphragm 227 toward the left. The diaphragm carries a stem 231 which is operatively associated with the shaft 212 in substantially the same manner as illustrated in Figs. 1, 2 and 4.

Upon actuation of the solenoid 18 of the valve 15 in Fig. 1, and if the valve control the conduit 214 connected to the intake 210 in the same manner that conduit 14 is connected to the conduit 10 in Fig. 1, vacuum will be imposed upon the diaphragm 227 and cause the same to move to the right until it engages the inner end of the stop 229 in opposition to the spring 228 and in this position the fuel valve which may be termed the throttle valve of the engine, is in substantially closed position.

Certain engines will more readily lend themselves to the use of one of these forms of valve control while others will more readily lend themselves to another form. However, all the forms are considered to be within the scope of the invention broadly disclosed in Fig. 1.

Reference will now be had to Figs. 5 and 6, wherein numerals of the three hundred series indicate like or equivalent parts. One series of visual signals is indicated by numerals 387, 388 and 389, colored if desired in the same manner as signals 87, 88 and 89. A second set of signals may be provided and these are in multiple with the first set and bear similar numerals but with the subscript a. One set may be mounted interiorly of the vehicle and the other set may be visible from two opposite directions and exteriorly mounted. Herein the valve controlling solenoid is indicated by the numeral 318, and the core is indicated by the numeral 317. It may be connected by a link 317a to an arm 334 associated with the shaft 312a. This shaft carries the fuel controlling valve. Also associated with the shaft is the manual control arm 338 actuable by the rod 339 in turn actuated by the foot or hand throttle. The spring 340 is operatively interposed between the arms 338 and 334.

The governor mechanism is substantially the same as that illustrated in Fig. 1 and the switch for actuating the signals is substantially the same as disclosed therein. The present form of the invention, however, contemplates derivation of power from the battery 399 grounded as at 399a and the supply line 397 of which leads to the ignition system supply line 400 and a branch 395 includes the fuse 396 therein, both the ignition and the control supply lines being controlled by the car ignition lock switch 398.

There is also provided on the dash in the present instance, a speed selection and fuel control switch structure 301 which includes a lock releasable oscillatable interior element that includes three contacts 303a, 303b and 303c. Line 320 from the solenoid, enclosed by tube 320a, may terminate in a contact 320b and this rotatable member is arranged for selective connection between the line 320 and one of the three contacts 303a, 303b or 303c. When the proper selection has been made for anyone of the predetermined speed conditions, the key may be withdrawn and the adjusting member then will be locked in the adjusted position.

Since the three lines 304a, 304b and 304c at one end connect to the terminals 303 having corresponding subscripts and terminate at the opposite end at the terminals 321 having corresponding subscripts and associated with each of the latter terminals are spring finger constructions 391 having corresponding subscripts, all of which are not only flexible but are simultaneously tiltable in the same manner that spring finger 91—see Fig. 1—is tiltable, it will be quite apparent that if the arrangement 301 is adjusted for the high speed control, then engagement of finger 391 for low speed with its associated adjustable contact 393 and/or second or intermediate speed contact finger 391 engages its corresponding contact 393 and no current will flow from the line 395.

It is only when high speed contact finger 391 engages its contact 393 that the current is supplied to the appropriate line 304 and through the same to the line 320 to actuate the solenoid 318 and operate the fuel valve for fuel valve actuation and automatic fuel control.

In a similar manner, if the manual speed selection switch structure 301 is adjusted to the intermediate speed there will be no actuation of the solenoid 318 when the low speed switch arrangement 391—393 is closed through governor actuation but the solenoid will be energized and the fuel valve actuated only when the intermediate speed switch arrangement is closed. When extreme low speed is to be imposed upon the vehicle, it will be quite apparent that immediately upon the low speed spring finger 391 being in electrical connection with its adjustable contact 393, the current will be supplied to the solenoid 318 for actuating the fuel valve thus preventing the vehicle from overspeeding.

It is to be further understood that in the rotation of portion 301a for speed selection, the structural arrangement is such that although arm 320b is rotated, the tubular member 320a is moved longitudinally in a corresponding manner.

In this manner since core 317 is relatively stationary until the switch is actuated, the travel thereof upon switch actuation to a position of solenoid registration, is only proportional to solenoid position adjustment. For low speed, the core moves the greatest distance insuring greatest closing of the valve. For highest speed, the core moves the least distance so that full registration of core and solenoid only secures fuel valve closing to a very slight degree relatively. This permits the engine when thus controlled to operate up to the predetermined high vehicle speed without fuel control and thereafter the fuel control is imposed upon the engine. The fuel control valve is controlled by arm 334 in turn rocked by link 317a connected to core 317. Solenoid 318 slides on this core when 320a is moved longitudinally in the rotation of 301a.

Now when the proper contact 303 corresponding to the lock determined speed selected is engaged by arm 320b and the actual speed switch 321 therefore, is closed, the solenoid 318 is energized. If there is a slow speed setup, the solenoid and core are but slightly telescoped. If maximum speed control is set up, maximum initial telescopic relation exists. If intermediate speed control is set up, the telescoping is of intermediate amount.

All this is regardless of solenoid energization or deenergization. Now when energized, at any selected speed, the core registers with solenoid or seeks the fully telescoped position. In so doing, the core has greatest movement at low speed, least at high speed, and an intermediate amount at an intermediate speed. Hence, fuel valve carried by shaft 312a is almost fully closed upon slow speed attainment, slightly closed at high speed attainment and partly closed therebetween at intermediate speed attainment.

The solenoid 318 is suitably supported in brackets carried by the intake, engine or carburetor and said brackets permit longitudinal movement of the solenoid but prevent rotational movement thereof as by a tongue and groove connection. Such a bracket mounting is not illustrated since same is quite conventional and would merely complicate Fig. 5.

The shell 301 of necessity is of insulation material and mounts the three circuit contact members 303a, 303b and 303c in insulated relation and to same are connected the selective circuit wires 304a, 304b and 304c, respectively. Since the actual speed switch controls these wires, member 301a controlled by key 301b—see Figs. 5 and 5A—may be of metal and arm 320b carried thereby thus is in electrical connection with conductor 320 preferably but not necessarily insulated at 320a. Such connection is recess 301c that slidably receives end 320c of wire 320. This recess is enlarged as at 301d and is provided with a spiral groove 301e therein. The recess enlargement 301d receives the inner end 320d having the lateral tongue 320e seated in the spiral groove.

The stationary sleeve 301 is the cylinder and part 301a is the barrel that slidably mounts a locking plunger 301f normally constrained to seat in one of the seats 301g corresponding to the contacts 303a, et cetera, so that upon key removal the speed selected is locked up.

Whenever it is desired to change the speed selection, key 301b is inserted which retracts plunger 301f from its recess or seat 301g and the barrel is rotated which not only rotates arm 320b but also due to the spiral groove 301e and end 320e causes the solenoid 318 to move longitudinally in its bracket support before mentioned, but not illustrated. 320a if of insulated character prevents accidental short circuiting of conductor 320. When the new speed selection is made, the key is removed and the plunger 301f seats in its new recess 301g.

It is to be understood that Fig. 5 is a conventional semi-diagrammatic representation of the preferred form of the invention. Likewise, it is to be understood the fuel control is but conventionally illustrated herein, although solenoid operable directly or indirectly and furthermore, each form of the invention contemplates manual control of the fuel valve, as desired within the range of speed control imposed on said valve, either automatically or both.

In Figs. 7 and 8 a pressure type embodiment of the form of the invention is shown similar to that in Fig. 1. In said figures numerals of the four hundred series designate like or equivalent parts.

In this form of the invention, the immediate fuel control portion of the invention is similar to that illustrated in Fig. 5 and parts are similarly numbered but of the four hundred series.

In said Figs. 7 and 8 there is illustrated a cylinder 426 in which is mounted piston 427 normally constrained by spring 428 toward non-controlling position. Piston rod 427a is connected by link 417a to lever 434 connected to throttle valve shaft 412a and associated with spring 440, also associated with lever 438 manually operable by rod 439 in a manner previously described with reference to corresponding parts illustrated in Fig. 5. An adjustable stop structure 429—430 may be employed, if desired.

Cylinder head 400 includes a bore 400a in which is mounted valve 416 having the angular passage 416a. Line 413 communicates with the bore by passage 413a. Passage 414 communicates with the cylinder at one end and the bore at the opposite end.

Another passage 401a communicates at one end with the bore and at the opposite end with discharge line 401. Cylinder 426 includes a port 426a which communicates with waste line 401 by a T connection 402 and nipple 402a.

The pressure supply line 413, when valve 416 is positioned with passage 416a in dotted line position, supplies oil under pressure from the oil pressure supply system of the vehicle to the cylinder to move the piston as far to the right as it can travel. Air to the right thereof escapes through port 426a.

When the valve 416 is positioned as shown by the full lines, the piston is returned by spring 428 to the full line position and the oil discharges through passage 401a, conduit 401, T 502 and return 403 to the crankcase of the engine.

The solenoid 418, when energized, attracts core 417 which through link 405, see Fig. 8, actuates arm 404 carried by the valve stem 416b. When the solenoid is deenergized, the spring 406 returns the parts to the full line position—see Fig. 8.

In Fig. 9 is illustrated a modified form of valve and core operating connection. In this figure, 516b indicates the valve stem, 504 a pinion rigid therewith, 506 and 505 a rack portion of the solenoid core 517. These parts may be substituted for parts 417, 404, 405 and 406 illustrated in Figs. 7 and 8 without departing from the scope of the invention.

While throughout the term "solenoid" has been employed, the same is intended to include an electromagnet with suitable linkage as well as a solenoid as such term is used in a specific sense.

This application is a continuation-in-part of the following copending applications, Serial No. 91,213 filed July 17, 1936, now Patent No. 2,169,267, dated August 15, 1939; Serial No. 93,800, filed August 1, 1936, now Patent No. 2,142,403, dated January 3, 1939; and Serial No. 100,650, filed September 14, 1936, now Patent No. 2,169,268, dated August 15, 1939.

While the invention has been described in great detail in the foregoing description, the same is to be considered as illustrative and not restrictive in character. The various modifications herein before described as well as others which will readily suggest themselves to persons skilled in this art, are all considered to be within the broad scope of this invention, reference being had to the appended claims.

The invention claimed is:

1. A selective speed control system for self-propelled vehicles having a device proportionally operable to vehicle speed, and an engine with a fuel supply passage with a valve in said passage, electrically operable means for said valve, a connection between said means and valve, a plurality of parallel circuits for the electrical operable means, a multiple switch structure for said circuits and operable by the device for energizing the electrically operable means at predetermined vehicle speeds, a second multiple switch structure for said parallel circuits, and manually operable means for selectively connecting the electrically operable means to the second multiple switch structure and simultaneously adjusting the connection between the electrically operable means and valve, the amount of adjustment being inverse to the selected speed for selective speed conditioning purposes whereby valve control is proportional to selected speed condition in that valve movement is least at highest selected speed and most at lowest selected speed.

2. A device as defined by claim 2, characterized by the addition of a locking arrangement for locking the manually operable means in any selected speed condition position.

NEEL M. McCULLOUGH.